US009870399B1

(12) United States Patent
Sinclair et al.

(10) Patent No.: US 9,870,399 B1
(45) Date of Patent: Jan. 16, 2018

(54) PROCESSING COLUMN-PARTITIONED DATA FOR ROW-BASED OPERATIONS IN A DATABASE SYSTEM

(71) Applicant: Teradata US, Inc, Dayton, OH (US)

(72) Inventors: Paul L. Sinclair, Manhattan Beach, CA (US); Grace K. Au, Rancho Palos Verdes, CA (US); Sanjay S. Nair, El Segundo, CA (US); David O. Craig, Upland, CA (US)

(73) Assignee: Teradata US, Inc., Dayton, OH (US)

( * ) Notice: Subject to any disclaimer, the term of this patent is extended or adjusted under 35 U.S.C. 154(b) by 342 days.

(21) Appl. No.: 14/135,497

(22) Filed: Dec. 19, 2013

Related U.S. Application Data

(60) Provisional application No. 61/747,756, filed on Dec. 31, 2012.

(51) Int. Cl.
*G06F 17/30* (2006.01)

(52) U.S. Cl.
CPC .................. *G06F 17/3048* (2013.01)

(58) Field of Classification Search
CPC ......... G06F 17/30498; G06F 17/30339; G06F 17/30466
USPC ................... 707/713, 636, 737, 715
See application file for complete search history.

(56) References Cited

U.S. PATENT DOCUMENTS

| | | | |
|---|---|---|---|
| 6,353,819 B1 * | 3/2002 | Edwards | G06F 8/30 |
| 6,772,163 B1 * | 8/2004 | Sinclair | G06F 17/30595 |
| 6,845,375 B1 * | 1/2005 | Sinclair | G06F 17/30339 |
| 6,944,633 B1 * | 9/2005 | Higa | G06F 17/30498 |
| 6,961,729 B1 * | 11/2005 | Toohey | G06F 17/30445 |
| 6,999,967 B1 * | 2/2006 | Ghazal | G06F 17/30498 |
| 7,080,072 B1 * | 7/2006 | Sinclair | G06F 17/30339 |
| 7,136,861 B1 * | 11/2006 | Sinclair | G06F 17/3033 |
| 7,203,686 B1 * | 4/2007 | Sinclair | G06F 17/30498 |
| 7,949,687 B1 * | 5/2011 | Sinclair | G06F 17/30312 707/758 |
| 8,321,420 B1 * | 11/2012 | Sinclair | G06F 17/30321 707/741 |
| 8,396,862 B2 * | 3/2013 | Sinclair | G06F 17/30463 707/714 |

(Continued)

*Primary Examiner* — Hanh Thai
(74) *Attorney, Agent, or Firm* — Randy L. Campbell, Jr.

(57) ABSTRACT

A database system may include a storage device to store a plurality of database tables. At least a portion of the database tables may be column-partitioned. The database system may also include a processor in communication with the storage device and a row-column subsystem executable by the processor to receive a request to locate a row of a column-partitioned database table. The row in the request may be used to provide a response to a query. The row-column subsystem may be further executable to determine if referenced column values of the requested row are stored in a cache associated with the row-column subsystem. The row-column subsystem may be further executable to retrieve the referenced column values of the row in the request from the cache in response to the determination that the column values are in the cache. The row-column subsystem may be further executable to provide the referenced column values for evaluation with respect to query conditions of the query. A method and computer-readable medium may also implement the row-column subsystem.

18 Claims, 6 Drawing Sheets

(56) References Cited

U.S. PATENT DOCUMENTS

| | | | |
|---|---|---|---|
| 8,838,598 B2 * | 9/2014 | Bhide | G06F 17/30312 |
| | | | 707/737 |
| 9,110,947 B1 * | 8/2015 | Watzke | G06F 17/30486 |
| 9,128,965 B1 * | 9/2015 | Yanacek | G06F 17/30292 |
| 2005/0027692 A1 * | 2/2005 | Shyam | G06F 17/30321 |
| 2006/0218123 A1 * | 9/2006 | Chowdhuri | G06F 17/30445 |
| 2007/0233637 A1 * | 10/2007 | Corvinelli | G06F 17/30536 |
| 2008/0059492 A1 * | 3/2008 | Tarin | G06F 17/30315 |
| 2008/0091642 A1 * | 4/2008 | Bestgen | G06F 17/30448 |
| 2010/0281017 A1 * | 11/2010 | Hu | G06F 17/30477 |
| | | | 707/718 |
| 2011/0173164 A1 * | 7/2011 | Bendel | G06F 17/30501 |
| | | | 707/693 |
| 2011/0191299 A1 * | 8/2011 | Huynh Huu | G06F 17/30 |
| | | | 707/646 |
| 2013/0173592 A1 * | 7/2013 | Yuan | G06F 17/30466 |
| | | | 707/719 |

* cited by examiner

PROCESSING COLUMN-PARTITIONED DATA FOR ROW-BASED OPERATIONS IN A DATABASE SYSTEM

CLAIM OF PRIORITY

This application claims the benefit of priority under 35 U.S.C. §119(e) of U.S. Provisional Patent Application Ser. No. 61/747,756 filed on Dec. 31, 2012, which is hereby incorporated by reference herein in its entirety.

BACKGROUND

1. Technical Field

The present disclosure relates generally to processing column-partitioned database tables, and more particularly to processing column-partitioned database tables in row-based tasks.

2. Related Art

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

Some database tables may be capable of partitioning database tables by column and by row. Column partitioning of a database table offers advantages. However, in row-based operations involving column partitioned tables, valuable resource time must be invested in reconstructing a row from the partitioned columns. Reconstruction of a row may involve retrieving each column referenced by the query, which may be stored in locations relatively far from one another, causing an undesirable amount of database system resources to be used to retrieve each referenced column in order to reconstruct a row.

SUMMARY

In one aspect of the present disclosure, a database system may include a storage device to store a plurality of database tables. At least a portion of the database tables may be column-partitioned. The database system may also include a processor in communication with the storage device. The database system may also include a row-column subsystem executable by the processor to receive a request to locate a row of a column-partitioned database table. The row in the request may be used to provide a response to a query. The row-column subsystem may be further executable to determine if referenced column values of the requested row are stored in a cache associated with the row-column subsystem. The row-column subsystem may be further executable to retrieve the referenced column values of the row in the request from the cache in response to the determination that the column values are in the cache. The row-column subsystem may be further executable to provide the referenced column values for evaluation with respect to query conditions of the query.

According to another aspect of the present disclosure, a method may include generating a cache configured to include column values of rows of column-partitioned database tables that have been previously read by the processor. The method may further include receiving a database query. The method may further include identifying a row of a column-partitioned database table to be analyzed in response to the database query. The method may further include determining if referenced column values of the requested row are stored in the cache. The method may further include retrieving the referenced column values of the row in the request from the cache in response to the determination that the column values are in the cache. The method may further include providing the referenced column values for evaluation with respect to query conditions of the query.

According to another aspect of the disclosure, a computer-readable medium may be encoded with a plurality of instructions executable by a processor. The plurality of instructions may include instructions to generate a cache configured to include column values of rows of column-partitioned database tables that have been previously read. The plurality of instructions may further include instructions to identify a row of a column-partitioned database table to be analyzed in response to the database query in response to receipt of a database query. The plurality of instructions may further include instructions to determine if referenced column values of the requested row are stored in the cache. The plurality of instructions may further include instructions to retrieve the referenced column values of the row in the request from the cache in response to the determination that the column values are in the cache. The plurality of instructions may further include instructions to provide the referenced column values for evaluation with respect to query conditions of the query.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE FIGURES

Figure 1:
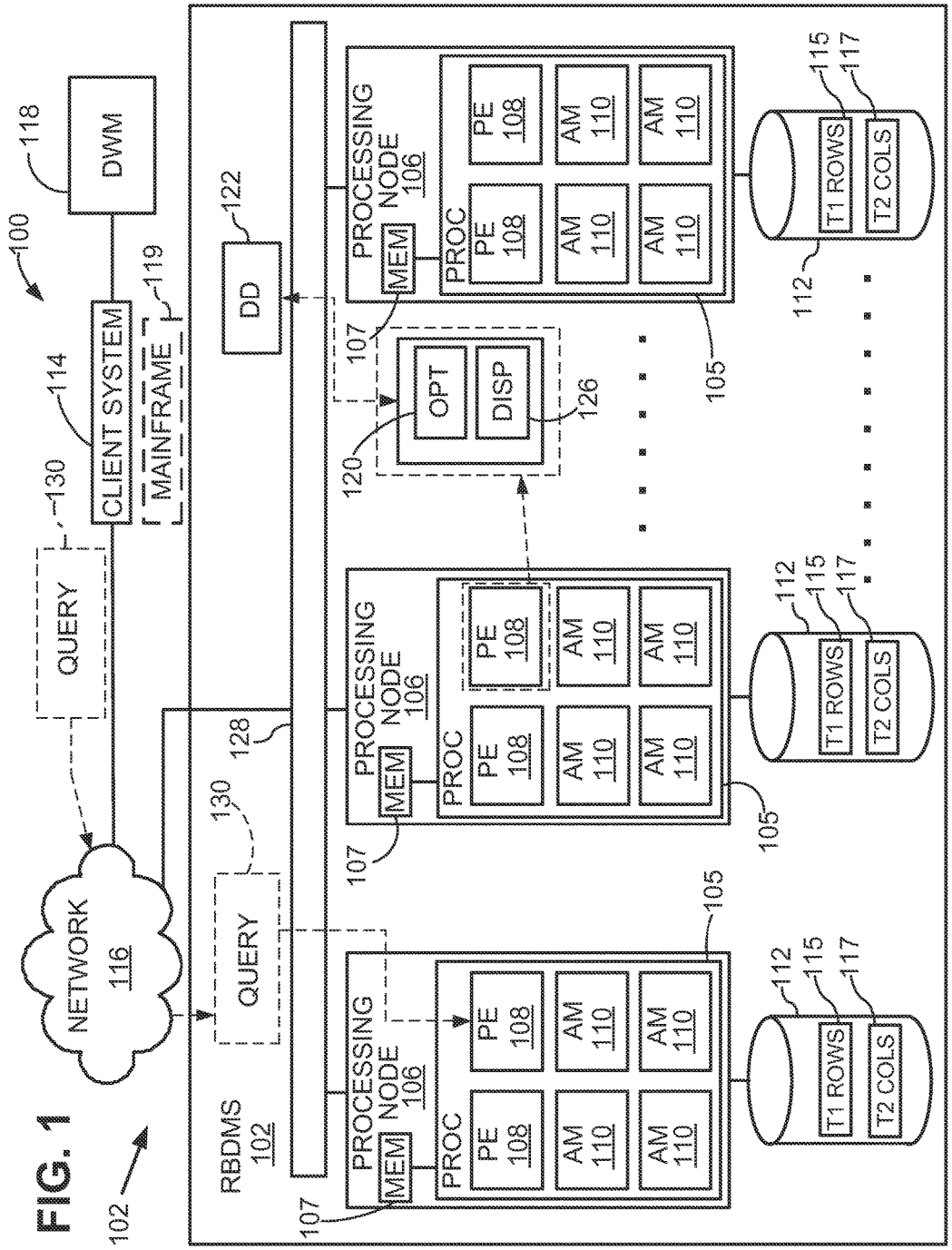
FIG. 1 is a block diagram of an example database system.

FIG. 1 is a diagrammatic representation of example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RBDMS 102 may be a massive parallel processing (MPP) system having an array of processing units and distributed memory. In alternative examples, the RBDMS 102 may implement a single processing unit, such as in a symmetric multiprocessing (SMP) system configuration. The RBDMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing units such as parsing engine (PE) modules 108 and access modules (AM) 110. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors. The access modules 110 may be access module processors (AMPs), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 107 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

The RBDMS 102 stores data in one or more tables in the DSFs 112. In one example, the database system 100 may be configured to distribute rows across access modules 110 and their associated DSFs 112 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to associated access modules 110 by a hash bucket map. The characteristics of the columns chosen for the primary index determine how evenly the rows are distributed. Alternatively, rows read from external sources may be randomly distributed to access modules 110 or, if internal sources, rows can be locally copied, randomly distributed, or hashed distributed to access modules 110.

For an access module 110, rows of each stored table may be stored DSFs 112, such as rows 115 to table T1 and columns 117 of table T2. The rows may be partitioned by row and/or column. Partitioning by rows is determined by one or more user-specified partitioning expressions. Partitioning by column is determined by user-specified grouping of one or more columns into each column partition. Each parsing engine module 108 may organize the storage of data and the distribution of table rows and columns. The parsing engine modules 108 may also coordinate the retrieval of data from the DSFs 112 in response to queries received, such as those received from a client computer system 114 connected to the RBDMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RBDMS 102.

Each parsing engine module 108, upon receiving an incoming database query, such as the query 130, may apply an optimizer module 120 to assess the best plan for execution of the query. An example of an optimizer module 120 is shown in FIG. 1 with regard to parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 2), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RBDMS 102 as well as fields of each database, for example. Further, the data dictionary module 122 may specify the type, length, and/or other various characteristics of the stored tables. The RBDMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary 122 may be stored in the DSFs 112 or some other storage device and selectively accessed.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g, processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally or alternatively, more than one channel may also allow distributed communication to reduce the possibility of an undesired level of communication congestion among processing nodes 106.

Figure 2:
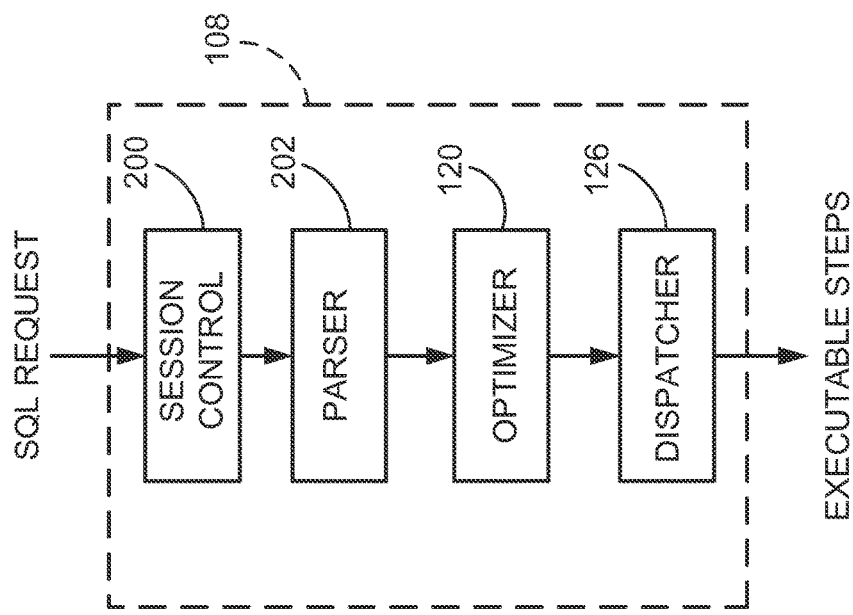
FIG. 2 is a block diagram of a portion of the example database system of FIG. 1.

In one example system, each parsing engine module 108 includes three primary components: a session control module 200, a parser module 202, and a dispatcher module 126 as shown in FIG. 2. The session control module 200 provides the logon and logoff functions. It accepts a request for authorization to access the database, verifies it, and then either allows or disallows the access. Once the session control module 200 allows a session to begin, an SQL request may be received such as through submission by a user and the SQL request is routed to the parser module 202.

Figure 3:
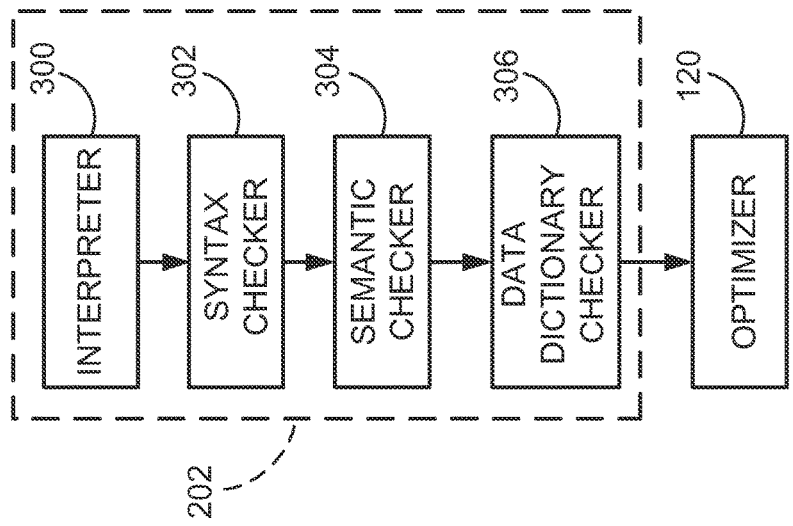
FIG. 3 is a block diagram of another portion of the example database system of FIG. 1.

As illustrated in FIG. 3, the parser module 202 may include an interpreter module 300 that interprets the SQL request. The parser module 202 may also include a syntax checker module 302 that checks the request for correct SQL syntax, as well as a semantic checker module 304 that evaluates the request semantically. The parser module 202 may additionally include a data dictionary checker 306 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

During operation, a query, such as the query 130, or utility may require the database system 100 to perform a row-based operation. This requires relevant rows to be located by a file system and returned for subsequent processing. However, column-partitioning presents issues related to row-processing. As data tables are column-partitioned, partitioned columns of a row may be distributed throughout the DSFs 112 associated with the access module 110 that manages that row. Thus, rows are broken up into the column partitions. Such partitioning requires the access module 110 to spend time gathering each referenced column value of a row in order for the row to be processed.

One example of column partitioning is described in U.S. patent application Ser. No. 12/300,066 filed on Nov. 18, 2011, which is hereby incorporated by reference in its entirety. Columns may be partitioned by the database system 100 and placed into physical storage, or "physical rows," of storage disks of the DSFs 112. In one example, the partitioned columns may be assigned a column partition number. Each column partition may include a number of container rows in which in the column values are stored. The length and number of container rows is dependent upon the number of column values and the size of the column values. When column partitioning a database table, the partitions may vary in placement, such that more than one column may be part of a column partition. Each of the container rows of a column partition may include one or more column partition values. Each column partition value may represent one or a concatenation of more than one column value. During query processing, referenced column-partitioned column values need to be accessed. Thus, these column values may each be associated with an identifier so that the column values can be located when needed.

Figure 4:
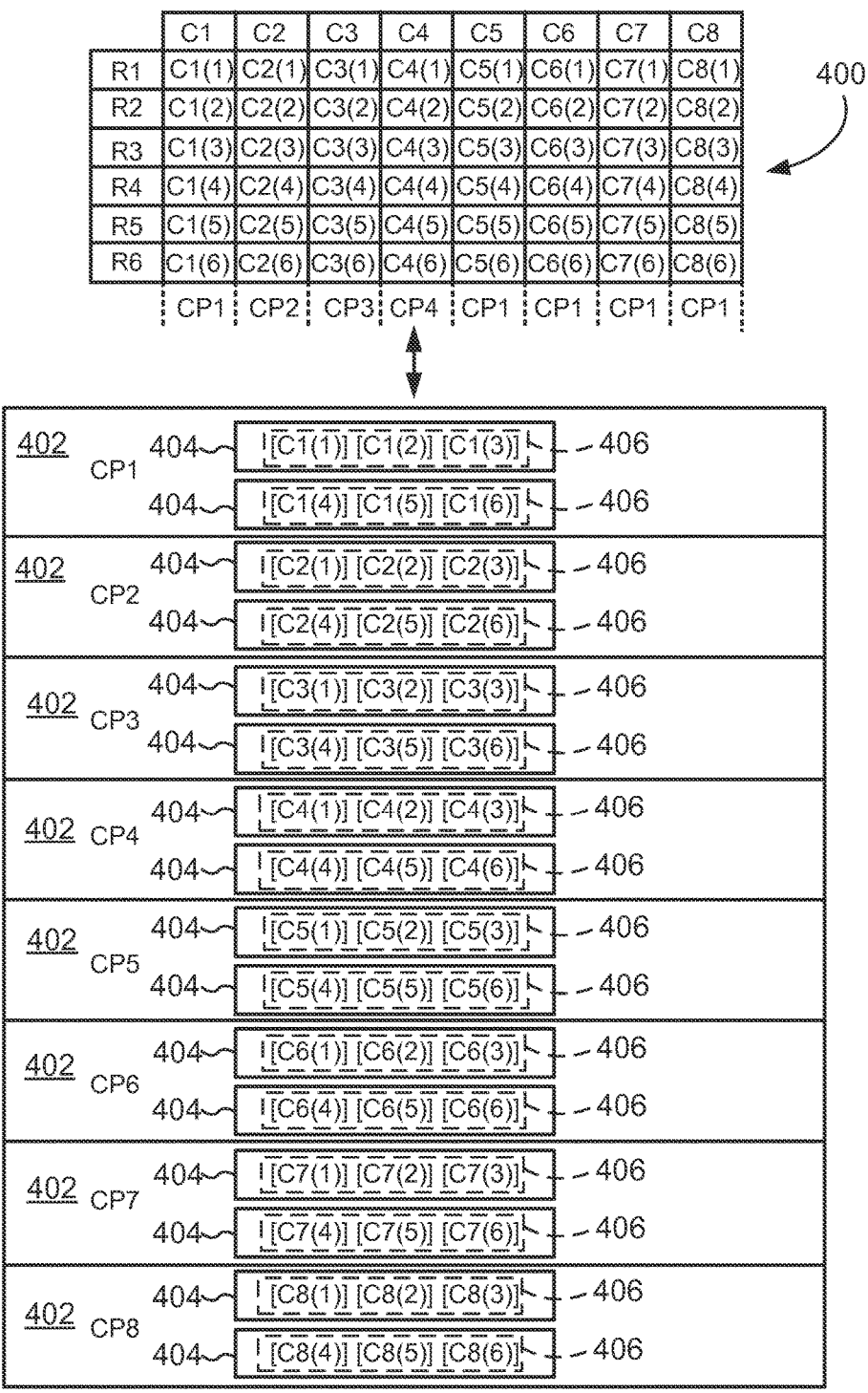
FIG. 4 is an example of column partitioning of a database table.

FIG. 4 shows an example of a table 400 being partitioned into a number of column partitions 402. Table 400 includes six rows, R1 through R6, eight columns C1 through C8. Each column is partitioned into a separate column partition 402. The partitioned column values may be placed into column container rows 404 within each column partition 402. Each container row 404 includes a number of column partition values 406. In FIG. 4, each column partition value 404 may represent one or more column values. In the example in FIG. 4, each column partition value 404 includes a single column entry. Each column partition value 404 may be associated with a unique identifier field referred to as a "rowid." The rowid may be a combination of various other identifiers. In one example, the rowid may include a column partition number, hash bucket value, and a uniqueness value.

Figure 5:
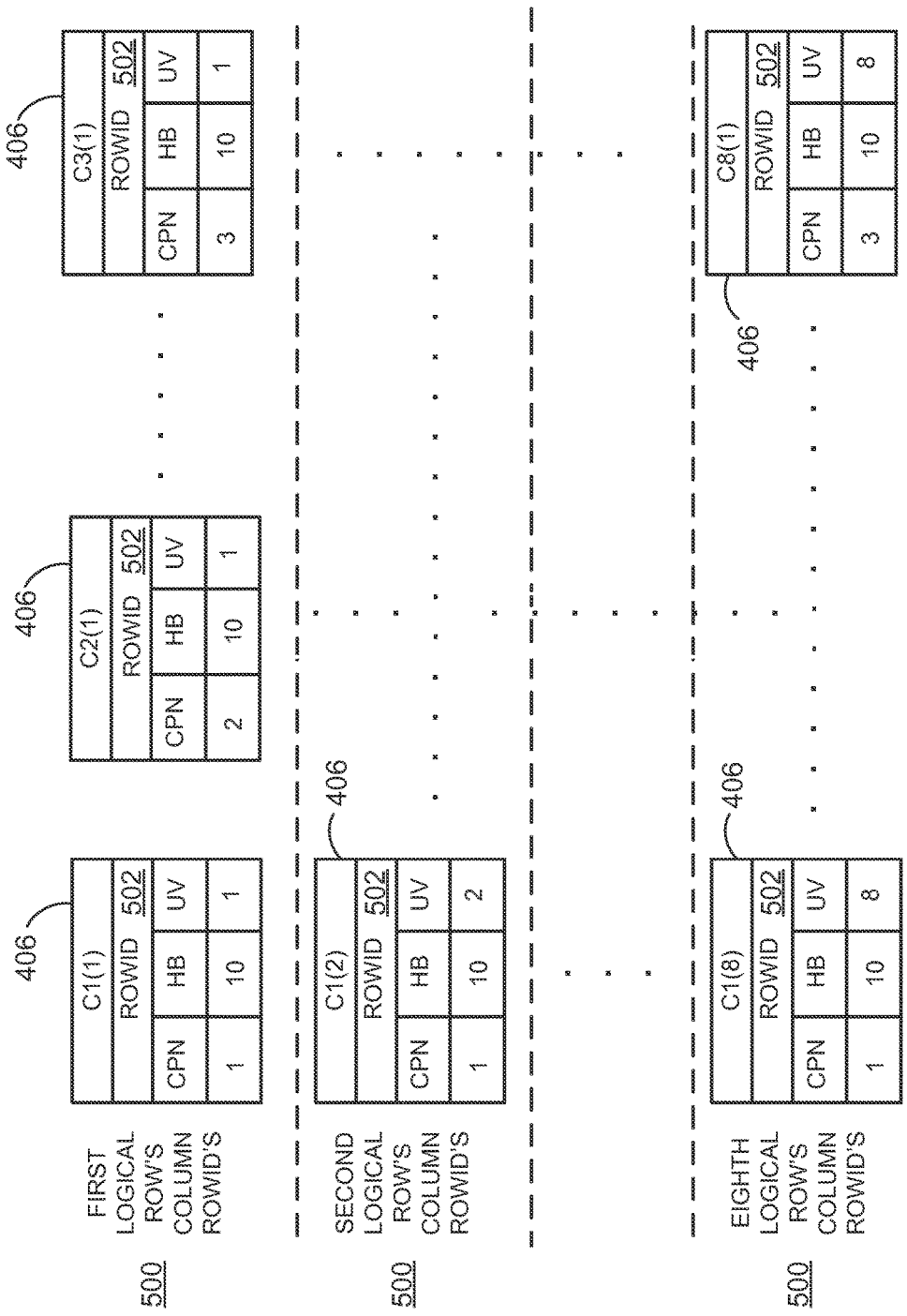
FIG. 5 is an example of a column-partitioned table.

For example, in FIG. 5 table 400 is shown. Each column-partitioned table may be considered to have a "logical row" 500. Thus, while the table is actually partitioned by column, the logical rows give reference to the columns in a row-based environment. In FIG. 5, the columns are partitioned such that there is one column per partition. Thus, each column value in a common column will have the same column partition number (CPN). The rowid 502 of each column value is shown to include the column partition number (CPN). The hash bucket value (HB) may indicate which access module 110 is associated with a particular row for a particular column row. This is typically the same for column-partitioned tables having no primary index. The uniqueness value (UV) allows the column partition value within a particular column partition to be located. For example, the only difference in the rowid's of the first column of table 400 is the uniqueness value. Using this format, a column partition value may be located once the column partition number, hash bucket value, and uniqueness value are known. In the example of FIG. 5, each column partition value 406 may represent a single column value of the table 400. However, in some scenarios, the column partition value 406 may be a concatenation of the multiple column values. In such scenarios, each column value may have a corresponding "fieldid" allowing the column value to be located within the particular column partition value.

Figure 6:
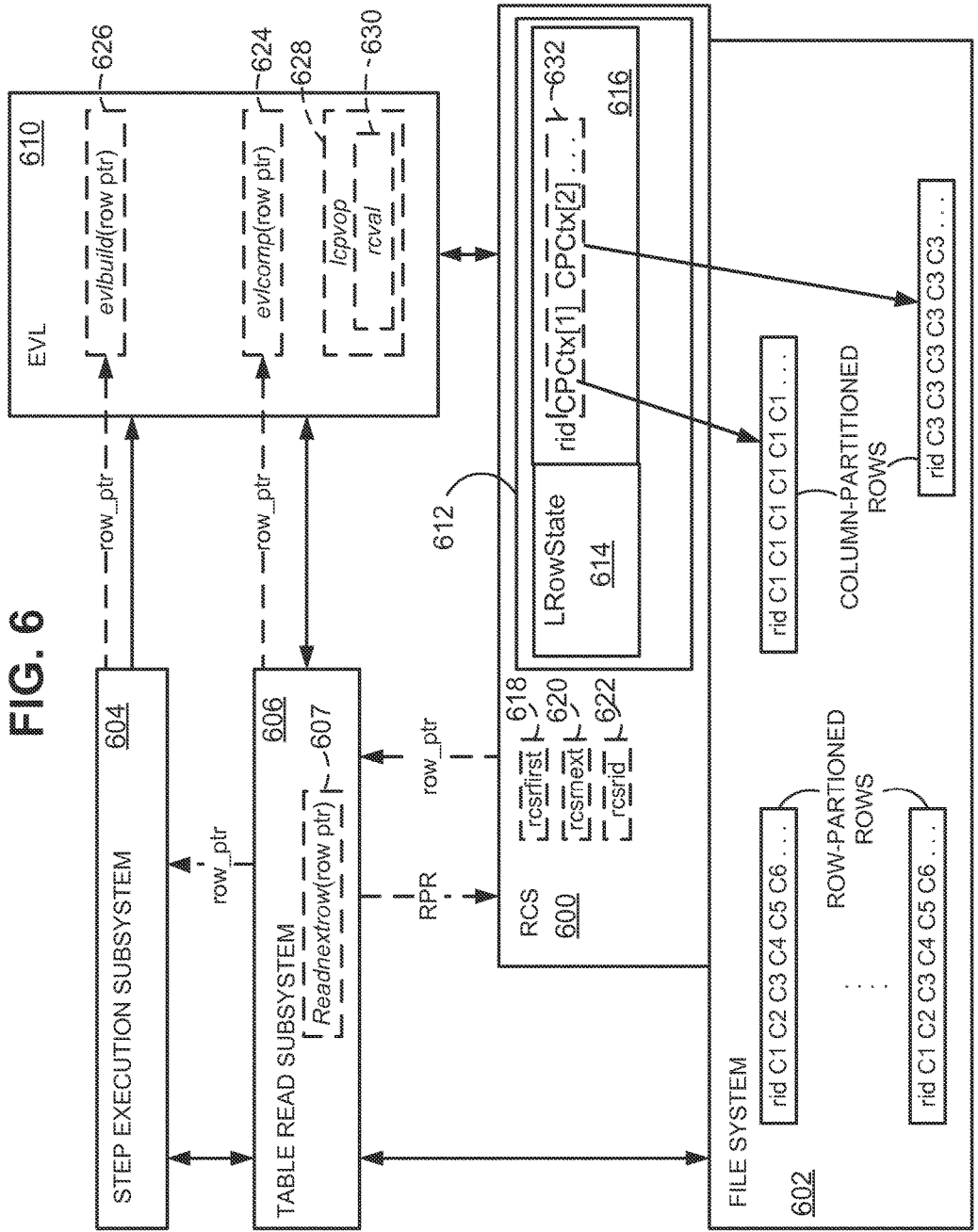
FIG. 6 is an example of a column-partitioned table management software environment implementable on a database system.

FIG. 6 is a block diagram of a row-column subsystem (RCS) 600 that may be used with the file system 602 (which includes DSFs 112) to allow rows of a data table to be assembled with less resource overhead when the data table is column-partitioned. The database system 100 may perform various actions with regard to a row-related query task. For example, a step execution subsystem 604 executed by one or more access modules 110 may be responsible for carrying out each step in responding to a query. In order to carry out these responsibilities, the step execution subsystem 604 may seek out a row pointer (row_ptr) to locate rows needed to respond to the query. The step execution subsystem 604 may interact with a table read subsystem 606, which may be executed by one or more access modules 110, to access a database table. The step execution subsystem 604 may need to read a next row in order to carry out the row-based task. The table read subsystem 606 may return a row pointer (row_ptr) to the step execution subsystem 604 using a function "readnextrow" 607 configured to provide a row pointer to the next row in a database table being accessed.

The table read subsystem 606 may specifically request a row pointer so that the row needed to carry out the row-related task may be located. The table read may be used to read a database table having the rows relevant to the row-related task. In one example, in performing the table read, the table read subsystem 606 may recognize that a table is column partitioned. Thus, row pointers used for non-column-partitioned tables are not applicable. Instead, the table read subsystem 606 may request row pointers to the logical rows associated with column-partitioned tables. In one example, the database system 100 may maintain information about a database table and how it is defined in the data dictionary 122 and the table header for the database table. This information allows the partitioning type of a table to be recognized when the table is being processed.

During the processing of row-related tasks, an evaluator module (EVL) 610, executed by one or more access modules 110, may perform the tasks of evaluating various conditions, such as predicates, in comparison to retrieved rows, as well as building result rows in response to row-related queries. Thus, in operation, the step execution subsystem 604 and the table read subsystem 606 may be responsible for providing the EVL module 610 with row pointers allowing the EVL module 610 to obtain the actual rows of the relevant database tables for subsequent processing.

Upon recognition that rows are needed from a column-partitioned table, the table read subsystem 606 may generate a row pointer request ("RPR") from the RCS 600. The request RPR may specifically request the first non-deleted rowid in a logical row. The RCS 600 may provide a row-level interface to the table read subsystem 606 for the column-partitioned tables. In one example, the RCS 600 may maintain a structure 612. The structure 612 may include a sub-structure LRowState 614 and an array CPCtx 616. The sub-structure 614 may maintain validity of a particular rowid of a logical row and, if valid, the state it is in. Such information may include whether a logical row exists or has been deleted, when the container row 406 with column partition for the logical row of interest have already been located, and if so, whether the column partition value has been located yet or is not within that container row 406. A logical row's rowid and LRowState are set by row-level functions, rcsrfirst 618, rcsrnext 620, and rcsrid 622. The rcsrfist function 618 may be responsible for providing a row pointer to the first non-deleted rowid in a logical row of a relevant table. The rcsrnext 620 may be responsible for providing a row pointer to next non-deleted rowid of the relevant table. The rcsrid function 622 may be responsible for locating the row for a specific logical rowid (for instance, that comes from an index). The array CPCtx 616 contains context information about a particular referenced-column partition and a file context that serves as a cache for the most recent physical row read for the column partition. In other words, the array CPCtx 616 maintains a recent set of column partition values that have already been read from the file system 602.

As table rows are processed, the table read sub-system 606 may call a function evlcomp 624 by the EVL module 610 in which the EVL module 610 determines if a row identified by the row pointer row_ptr qualifies for single-table conditions or join conditions specified in a query being processed. If a row is qualified, the step execution subsystem 604 may call function evlbuild 626 from the EVL 610 to build a result row. Since a logical row does not have actual column values, the EVL 610 may call a function operation lcpvop 628. Internally, the function lcpvop 628 may return a starting address of a column partition value for a logical row's rowid. The function lcpvop 628 may call another function rcval 630 and pass it a value CPCtxIDx 632 that identifies the column partition to read. In one example, CPCtxIDx 632 is an index into the array CPCtx 616 maintained within the logical row. For example, in the array CPCtx 616 in FIG. 6, each array entry CPCtx[1], CPCtx[2], etc., may exist for each column partition that has at least one referenced column. As illustrated in FIG. 6, each instance of CPCtx 616 may contain a physical row from the file system 602.

With the logical row's rowid and a column partition context, the function rcval 630 can determine if another read to the file system 602 needs to be performed to read in the physical row that contains the column partition value for the given rowid and returns the starting address of the column partition value within the container row. Thus, if a physical row containing a column value is already contained within the cache of the array CPCtx 616 in the RCS 600, the function rcval 630 recognizes this, and thus, no read from the file system 602 is required. If the physical row is not in the cache, the file system 602 may be called by the RCS 600 in order to locate and retrieve the physical row. Note that column partitions with no referenced columns for the query do not need to be read by the file system.

Figure 7:
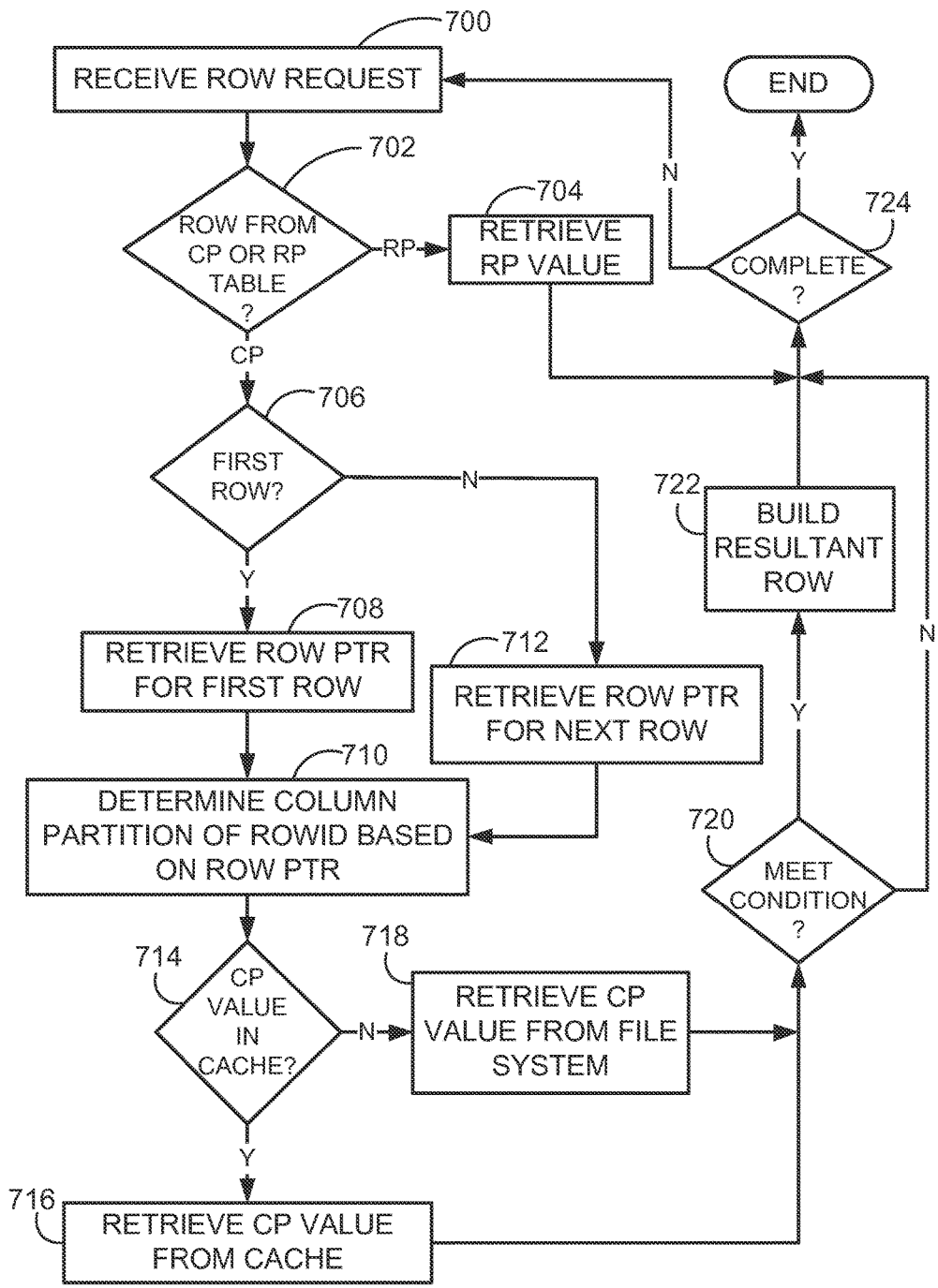
FIG. 7 is an operational flow diagram of example operation of a database system handling column-partitioned database tables for a row-based operation.

FIG. 7 is an operational flow diagram of the database system 100 implementing the RCS 600. In one example, a row request may be received by the database system 100 (700). The row request may be in the form of a row-based task as part of a received query 130 by the database system 100. The row request may be processed by the step execution subsystem 604, which recognizes that a row is being requested in order to meet a query. Upon determining that a row is needed, the database system 100 may determine if the row is from a non-column-partitioned or column-partitioned table (702). If the row is from a non-column-partitioned table, the row may be retrieved from the file system (704) and another row request may be received or the process of responding to the query may end.

If the row is from a column-partitioned table, the database system 100 may invoke the RCS 600 to provide a row pointer to a logical row associated with the row needed. In one example, the database system 100 may determine if the row is the first non-deleted rowid in the logical row (706). To determine such a condition, the table read subsystem 606 may call the RCS 600, which may return the row pointer (row_ptr) to the first non-deleted rowid in the logical row (708). If the first non-deleted rowid in the logical row has already been read, the row pointer to the rowid for the next valid logical row may be retrieved (710).

The row pointer may be used by the EVL module 610 to determine the column partition of the associated rowid (712). In one example, the EVL module 610 may carry out such a determination through the use of the lcpvop function

628. The lcpvop function 628 may call another function, the rcval function 630, while passing it an index CPCtxIDx 632 into the CPCtx array 616. Based on this information as well as the logical row's rowid from the row pointer, the rcval function 630 may determine whether or not the column partition values associated with the requested rows are currently in the cache of the RCS 600 (714). If so, the column partition value may be retrieved and provided to the EVL module 610 (716). If the column partition value is not contained in the cache, the RCS 600 may retrieve the column partition value from the file system 602 (718). Upon retrieval of the column partition value, the relevant column values may be processed by the EVL module 610 through the evlcomp function 624 to determine if the column values meet the conditions of the query (720). If so, the EVL module 610 may use the qualifying column values to build the result rows through the evlbuild function 626 (722). The database system 100 may then determine if the response to the query is complete (724). If not, the next row request may be received (700). If complete, the activity may end.

In one example of the operation of the RCS 600 a column partition may be created through the following SQL statement CREATE TABLE Orders
Order# INTEGER, Item# INTEGER, Spec_Inst VARCHAR(1000))
NO PRIMARY INDEX PARTITION BY COLUMN An example of the resultant table with data included is as follows:

TABLE 1

| Order# | Item# | Spec_Inst | Row# |
|---|---|---|---|
| 1 | 6 | Null | 1 |
| 2 | 85 | Ship Fedex to James houses . . . | 2 |
| 3 | 7 | Ship to Jones at Washington | 3 |
| 4 | 1 | Hold until further instruction | 4 |

In one example, the database system 100 may receive a query statement as follows:

SELECT Order#, 'Spec Inst' FROM Orders
WHERE Item#=7 and Spec_Inst LIKE '% Jones %'

The step execution subsystem 604 may receive a row request that is passed onto the table read subsystem 606. The table read subsystem 606 may call the rcsrfirst function 618 in recognition that the Orders table (Table 1) is a column-partitioned table. The rcrfirst function 618 may return a row pointer to the first non-deleted rowid in the logical row. Upon receipt of the row pointer, the table read subsystem 606 may pass on the row pointer to the EVL module 610 to locate the relevant row for evaluation. In one example, the EVL module 610 may call the lcpvop function 628, which in turn calls the rcval function 630, while passing it a CPCtxIDx value 632 that identifies the column partition to read. In this example, the rcval function 630 may read the column partitions as follows:

1. Read Current Orders.Item# using the rowid in the logical row modified by adding 1 to the partition number to position (return False if no more rows) to the corresponding column container row.
2. Loop through column partition values in the container row (skipping over any column partition values where the corresponding delete column partition bit is set or the column partition value is not present, that is, null) and compare the Item# value to 7 incrementing rowid in the logical row until the end of container row (go to 1) or value 7 is found.
3. Read Orders.Spect_Inst using the rowid in the logical row modified by adding 2 to the partition number using the most appropriate file system call to get this column container row depending on the proximity, or avoid a file system call if the column container row is currently being stored in the cache of the CPCtx array 616.
4. Position the column partition at value corresponding to the row number within this container row (based on presence bits and run lengths).
5. Evaluate LIKE predicate with this Spec_Inst column value and '% Jones %'.
   a. If not equal, increment the rowid in the logical row and go to 1.
   b. Return true with current rowid and the logical row.

If true, the evlcomp function 624 may build a row of projected columns Order# and Spec_Inst (using the column partition context) based on the returned rowid and spool and then call the rcsrnext function 620 to increment the rowid and repeat the condition evaluation. Otherwise the scan is complete.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A database system comprising:
   a storage device configured to store a plurality of database tables, wherein at least a portion of the database tables are column-partitioned database tables, wherein each column-partitioned database table is partitioned into a plurality of column groups, wherein each column group comprises one or more entire columns of a respective column-partitioned database table, and wherein each column of the column groups is logically stored as a row;
   a processor in communication with the storage device; and
   a row-column subsystem executable by the processor to:
   receive a request to locate a row of a column-partitioned database table, wherein the row in the request is to be used to provide a response to a query;
   determine if referenced column values of the requested row are stored in a cache associated with the row-column subsystem;
   retrieve the referenced column values of the row in the request from the cache in response to the determination that the column values are in the cache; and
   provide the referenced column values for evaluation with respect to query conditions of the query.

2. The database system of claim 1, wherein the row-column subsystem is further executable to retrieve column values from the storage device in response to the determination that the requested row is absent from the cache.

3. The database system of claim 1, wherein the row-column subsystem is configured to maintain a data structure that comprises a first structure and a second structure, wherein the first structure is configured to indicate validity and a state of a logical row of column-partitioned database table and the second structure is configured to indicate context information regarding a particular referenced column partition and a file context that is the cache.

4. The database system of claim 1, wherein the cache includes an indexed array of column values from at least one row of a column-partitioned database table, wherein the request to locate a row of a column-partitioned database table includes an index value, wherein the row-column subsystem is further configured to determine if the indexed array of column values stored in the cache are part of the row requested to be located based on the index value.

5. The database system claim 4, wherein the row-column system is further executable to:
receive a request to provide a row pointer to a first non-deleted logical row of a column-partitioned database table; and
provide the row-pointer in response to the request to provide the row pointer.

6. The database system of claim 5, wherein the row-column subsystem is further executable to:
receive a request to provide a second row pointer to a next logical row of the column-partitioned database table;
provide the second row pointer to locate the requested second row of the column-partitioned database table; and
use the second row pointer to locate at least one column value of the column-partitioned database table.

7. A method of operating a database system, the method comprising:
generating, with a processor, a cache configured to include column values of rows of column-partitioned database tables that have been previously read by the processor, wherein each column-partitioned database table is partitioned into a plurality of column groups, wherein each column group comprises one or more entire columns of a respective column-partitioned database table, and wherein each column of the column groups is logically stored as a row;
receiving, with a processor, a database query;
identifying, with the processor, a row of a column-partitioned database table to be analyzed in response to the database query;
determining, with the processor, if referenced column values of the requested row are stored in the cache;
retrieving, with the processor, the referenced column values of the row in the request from the cache in response to the determination that the referenced column values are in the cache; and
providing, with the processor, the referenced column values for evaluation with respect to query conditions of the query.

8. The method of claim 7 further comprising retrieving, with the processor, column values from the storage devices in response to the determination that the referenced column values are absent from the cache.

9. The method of claim 7, further comprising generating, with the processor, a first data object and a second data object, wherein the first data object is configured to indicated validity and a state of a logical row of a column-partitioned database table and the second data object is configured to indicate context information regarding a particular referenced column partition and a file context that is cache.

10. The method of claim 7, wherein the cache is configured to include an indexed array of column values from at least one row of a column-partitioned database table, wherein identifying, with the processor, the row of the column-partitioned database table to be analyzed comprises processing, with the processor, a request to locate the row of the column-partitioned database table that includes an index value, wherein the method further includes determining, with the processor, if the indexed array of column values stored in the cache are part of the row requested to be located in the index value.

11. The method of claim 10, further comprising:
receiving, with the processor, a request to provide a row pointer to a first non-deleted logical row of a column portioned database table; and
providing, with the processor, the row pointer in response to the request to provide the row pointer.

12. The method of claim 11, further comprising:
receiving, with the processor, a request to provide a second row pointer to a next logical row of the column-partitioned database table; and
providing, with the processor, the second row pointer to locate the requested second row of the column-partitioned database table.

13. A computer-readable medium encoded with a plurality of instructions executable with a processor, the plurality of instructions comprising:
instructions to generate a cache configured to include referenced column values of rows of column-partitioned database tables that have been previously read, wherein each column-partitioned database table is partitioned into a plurality of column groups, wherein each column group comprises one or more entire columns of a respective column-partitioned database table, and wherein each column of the column groups is logically stored as a row;
instructions to identify a row of a column-partitioned database table to be analyzed in response to the database query in response to receipt of a database query;
instructions to determine if referenced column values of the requested row are stored in the cache;
instructions to retrieve the referenced column values of the row in the request from the cache in response to the determination that the column values are in the cache; and
instructions to provide referenced column values for evaluation with respect to query conditions of the query.

14. The computer-readable medium of claim 13, wherein the plurality of instructions further comprise instructions to retrieve referenced column values from the storage devices in response to the determination that the requested row is absent from the cache.

15. The computer-readable medium of claim 14, wherein the plurality of instructions further comprise instructions to generate a first data object and a second data object, wherein the first data object is configured to indicated validity and a state of a logical row of a column-partitioned database table and the second data object is configured to indicate context information regarding a particular referenced column partition and a file context that is cache.

16. The computer-readable medium of claim 14, wherein the cache is configured to include an indexed array of column values from at least one row of a column-partitioned database table, wherein the instructions to identify the row of the column-partitioned database table to be analyzed comprise instructions to process a request to locate the row of the column-partitioned database table that includes an index value, wherein the plurality of instructions further comprise instructions to determine if the indexed array of column values stored in the cache are part of the row requested to be located in the index value.

17. The computer-readable medium of claim 16, wherein the plurality of instructions further comprise:

instructions to receive a request to provide a row pointer to a first non-deleted logical row of a column portioned database table; and instructions to provide the row pointer in response to the request to provide the row pointer.

18. The computer-readable medium of claim 17, wherein the plurality of instructions further comprise:

instructions to receive a request to provide a second row pointer to a next logical row of the column-partitioned database table; and instructions to provide the second row pointer to locate the requested second row of the column-partitioned database table.

\* \* \* \* \*